(12) United States Patent
Kuhn et al.

(10) Patent No.: US 7,771,062 B2
(45) Date of Patent: Aug. 10, 2010

(54) REARVIEW MIRROR WITH ILLUMINATED AREA

(75) Inventors: Joerg Kuhn, Stuttgart (DE); Alexander Pirner, Deizisau (DE); Andreas Erber, Osfildem (DE); Florin Secanu, Nürtingen (DE)

(73) Assignee: SMR Patents S.a.r.l., Luxembourg (LU)

( * ) Notice: Subject to any disclaimer, the term of this patent is extended or adjusted under 35 U.S.C. 154(b) by 0 days.

(21) Appl. No.: 12/049,329

(22) Filed: Mar. 15, 2008

(65) Prior Publication Data

US 2008/0225417 A1   Sep. 18, 2008

(51) Int. Cl.
  *G02B 5/08*  (2006.01)
  *G02B 5/26*  (2006.01)
  *B60Q 1/26*  (2006.01)
  *B60R 1/12*  (2006.01)

(52) U.S. Cl. ...................... 359/839; 362/494
(58) Field of Classification Search ................. 359/838, 359/839; 362/494, 619, 620, 621, 625, 626
  See application file for complete search history.

(56) References Cited

U.S. PATENT DOCUMENTS

| 4,461,442 A | | 7/1984 | Keenan | |
| 4,882,565 A | * | 11/1989 | Gallmeyer | 340/461 |
| 4,906,085 A | * | 3/1990 | Sugihara et al. | 359/839 |
| 4,929,866 A | * | 5/1990 | Murata et al. | 313/500 |
| 5,223,814 A | | 6/1993 | Suman | |
| 5,241,457 A | * | 8/1993 | Sasajima et al. | 362/503 |
| 5,313,335 A | * | 5/1994 | Gray et al. | 359/839 |
| 5,575,552 A | | 11/1996 | Faloon et al. | |
| 5,938,320 A | * | 8/1999 | Crandall | 362/494 |
| 6,045,243 A | | 4/2000 | Muth et al. | |
| 6,111,683 A | * | 8/2000 | Cammenga et al. | 359/267 |
| 6,123,431 A | * | 9/2000 | Teragaki et al. | 362/625 |
| 6,257,746 B1 | * | 7/2001 | Todd et al. | 362/494 |
| 6,276,821 B1 | * | 8/2001 | Pastrick et al. | 362/494 |
| 6,511,192 B1 | * | 1/2003 | Henion et al. | 359/864 |
| 6,880,960 B2 | * | 4/2005 | Mishimagi | 362/522 |
| 7,018,088 B2 | * | 3/2006 | Yu et al. | 362/620 |
| 7,273,311 B2 | * | 9/2007 | Yu | 362/620 |
| 7,416,318 B2 | * | 8/2008 | Mathieu | 362/492 |
| 7,510,311 B2 | * | 3/2009 | Romas et al. | 362/494 |
| 2006/0012990 A1 | * | 1/2006 | Walser et al. | 362/235 |

FOREIGN PATENT DOCUMENTS

DE   198 08 393 A1   9/1999

* cited by examiner

*Primary Examiner*—Ricky D Shafer
(74) *Attorney, Agent, or Firm*—Reising Ethington P.C.

(57) ABSTRACT

The rearview mirror comprises a mirror glass, which is mounted to a carrier plate. A display unit is disposed behind the mirror glass and the carrier plate, which generates a light beam by means of an illuminant, wherein said light beam is coupled into a light conductor. The light beam is directed outward by means of a reflection free portion of the mirror glass, so that light passing through is directed towards the driver by means of the deflection optics.

11 Claims, 4 Drawing Sheets

Fig. 4
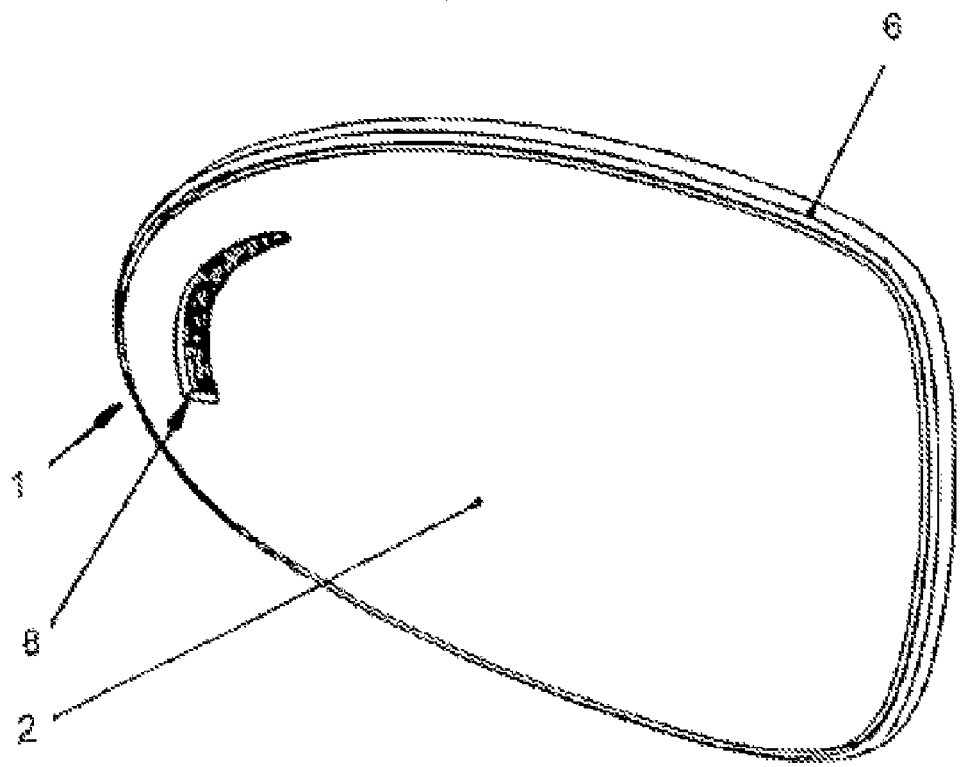
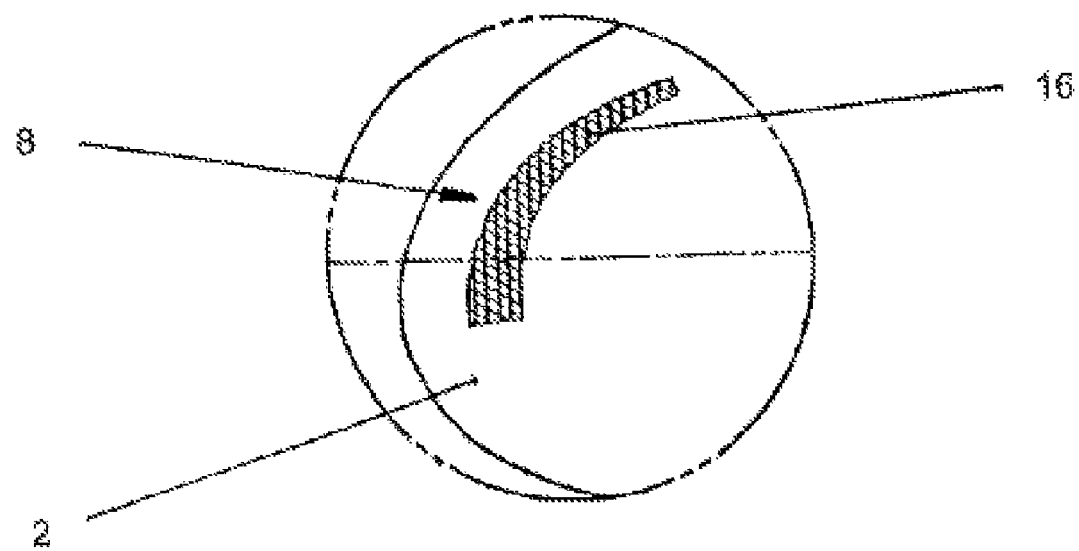
Fig. 5

REARVIEW MIRROR WITH ILLUMINATED AREA

BACKGROUND OF THE INVENTION

The invention is based on a priority patent application 07005228.7 which is hereby incorporated by reference.

The invention relates to a rearview mirror for vehicles, preferably for motor vehicles, comprising a mirror glass, mounted to a carrier plate, a display unit, disposed behind the mirror glass and the carrier plate, which generates a light beam by means of at least one illuminant, wherein said light beam can be coupled into a light conductor, which is provided with a reflector side and decoupling optics, by means of which the light beam is directed outward by means of a portion of the mirror glass, which is at least partially reflection free, wherein the reflector side comprises at least two reflection surfaces, and light passing through the mirror glass is directed towards the driver by means of the deflection optics.

Rearview mirrors are known, in which displays are provided behind the mirror glass. These are complex systems, comprised of a display and an electronic circuit configured for the display. In the portion of the displays, the reflective coatings of the mirrors are removed, so that the display can emit optical information in the form of letters, symbols, and/or warning lights.

From DE 198 08 393 A1, a display device for motor vehicles is known, in which optical information is transmitted to the driver or to other traffic partners through the mirror surface of the rearview mirror. For this purpose, light is emitted by a light source into the front face of a light conductor, and emitted at its other front face in the housing substantially parallel to the mirror surface through the light passage openings in the mirror glass, or of the mirror housing. Through the optical information, other traffic partners are irritated, or even impaired.

From WO 00/06944, an exterior rearview mirror with a display unit is known, which is located behind a mirror glass. Thus, light from a light source is emitted through collector optics and through an optical disk onto a filter foil, which directs the light.

SUMMARY OF THE INVENTION

It is the object of the invention to provide the rearview mirror of this genus, so that the light passing through the mirror glass does not affect other traffic partners besides the driver, while maintaining the configuration simple.

In the rearview mirror according to the invention, the light exiting from the mirror glass in the reflection free portion is directed towards the driver, so that only he can sense the light, but other traffic partners cannot. Therefore, there is no risk to irritate other traffic partners. Thus, the rearview mirror is constructed in a simple manner and can be configured very flat. It is helpful in this context in this context that the light source emits its light directly into the light conductor.

The light conductor is advantageously configured, so that a relatively large emission surface for the display is achieved by multiple deflections of the light. State of the art systems with equal performance require many times the installation volume for the optics required for illuminating large display surfaces.

In the portion of the display, the reflecting coating is advantageously removed on the backside of the mirror glass according to the size and shape of the display.

In order for the display not to be directly visible by an external viewer, the thickness of the coating is preferably reduced so far, that it is facilitated for the display to shine through.

As another variant, the reflecting coating can be removed in the display area in very small stripes disposed at a small distance from one another. In such an embodiment, the impression of a mirrored surface is created for the viewer in non-illuminated condition and in illuminated condition the impression of a homogenous coherent illuminated display is created.

The light conductor preferably comprises deflection optics, by which the light beams of the light source can be deflected, so that they are exclusively emitted at a predetermined angle. As an additional safety for this light alignment, a foil is provided, which filters in the same direction. Thus, it is assured that the subsequent traffic or other traffic partners located on the side cannot sense any of these signals.

The display with aligned emission direction can certainly be combined with other displays, like e.g. position lights or signal lights. For this purpose, the other displays can be combined in a unit as part of an entire display unit.

In the rearview mirror according to the invention, the light can exit through a light permeable portion of the frame, surrounding the mirror glass. Thus, the light is also directed to the driver, so that only he, but not other traffic partners, can sense the light. The light path from the illuminant to the exit portion in the frame is advantageously configured in the same way, as the light passage through the mirror glass.

Further features of the invention can be derived from the subsequent claims, the description, and the drawings.

BRIEF DESCRIPTION OF THE DRAWINGS

The invention is described in more detail with reference to several embodiments shown in the drawing. It is shown in:

FIG. 4 the rearview mirror according to the invention in perspective view;

FIG. 5 another embodiment of a display;

DETAILED DESCRIPTION OF THE DRAWINGS

Figure 1:
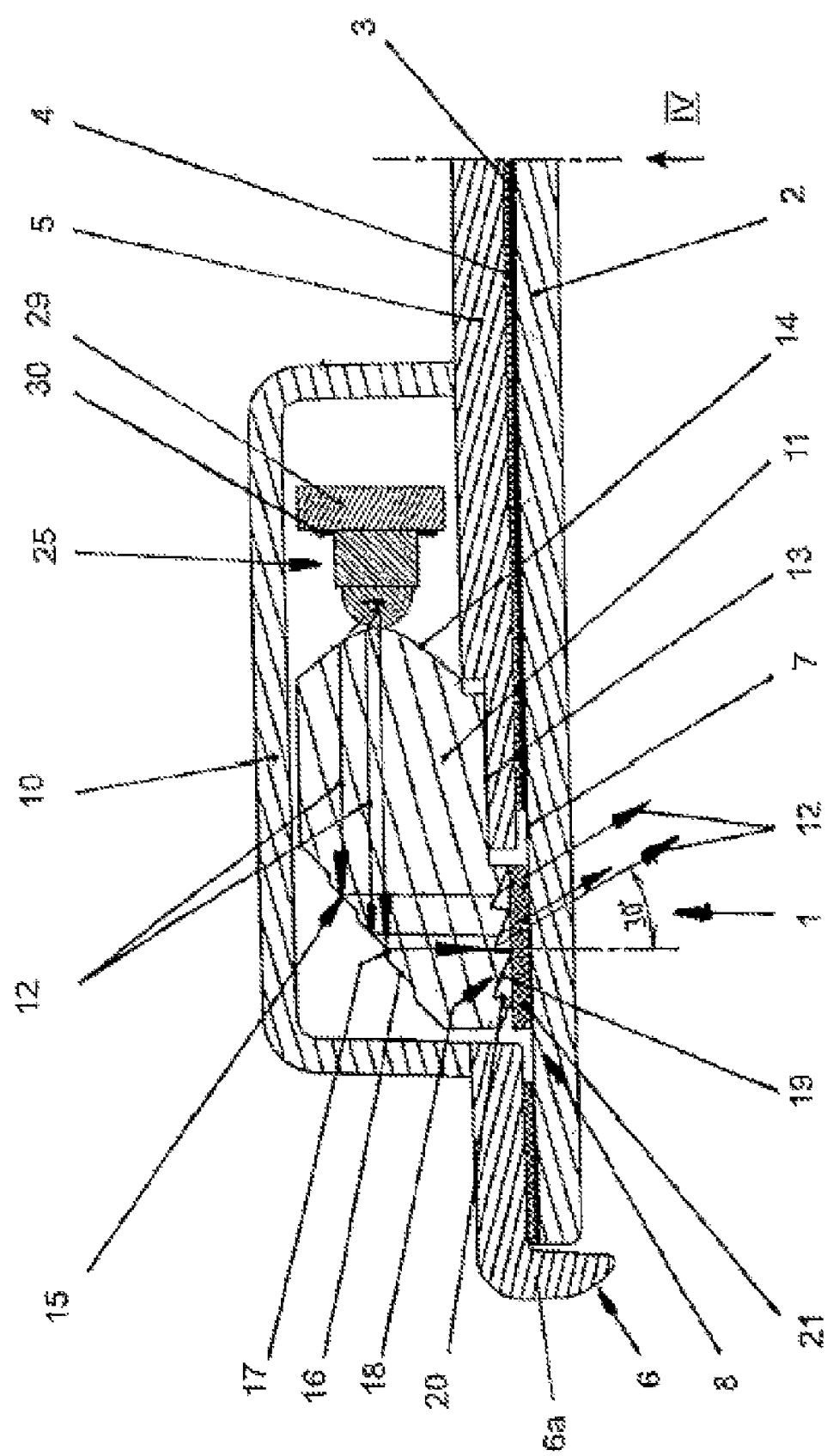
FIG. 1 a sectional view of a rearview mirror according to the invention comprising a display unit.

In the rearview mirror according to FIG. 1, a display 1 is provided behind a mirror glass 2. The mirror glass 2 is provided with a reflecting layer 3 on its backside, onto which a glue layer 4 for connecting the mirror glass 2 with a carrier plate 5 is imparted. The glue layer 4 can be formed by a coated foil, which is adhesive on both sides. The adhesive layer however can also be only provided on one side with a thin coating, which is applied to the carrier plate 5, or to the backside of the mirror glass 2. The carrier plate 5, which is typically made of plastic, is mounted in exterior rearview mirrors in mirror housings, so it can be pivoted about two axes. The carrier plate 5 can thereby be adjusted mechanically or electrically for adjusting the mirror glass. In interior rearview mirrors the mirror housing is typically attached to the mirror glass 2. The mirror housing can be adjusted according to the viewing angle of the driver.

The mirror glass 2 is provided for an exterior mirror in the illustrated embodiment. In order to protect the mirror glass 2, the carrier plate 5 is provided as a frame 6 at its rim, which is provided L-shaped in cross section, and which surrounds the mirror glass 2 with its outer arm 6a at a small distance. The arm 6a is disposed perpendicular to the mirror glass 2 and protrudes beyond the mirror glass. This configuration avoids that the mirror glass 2 can be damaged or destroyed at its very sensitive exterior rim by impacts or similar.

The display 1 is disposed on the side of the carrier plate 5, which is located opposite to the mirror glass 2. Said display comprises at least one illuminant 25, preferably an LED, which is mounted on a circuit board 29. It is provided with conductor paths 30, so-called print paths, on the side facing the illuminant 25, or on the side facing away from the illuminant, by means of which the illuminant 25 is connected in an electrically conductive manner. The light 12 emitted by the illuminant 25 is provided to a light conductor 11, at which the illuminant 25 contacts in an advantageous manner. This side of the light conductor 11 is configured optically, so that the beams 12 are almost conducted in parallel within the light conductor. Such light conductors 11 are typically comprised of a refined polymethylmethacrylat (PMMA). In order to be able to align the light conductor 11 precisely relative to the illuminant 25 it is provided with a reference surface 13, by means of which it is mounted so it contacts the carrier plate 5. The reference surface 13 is also flat.

Figure 2:
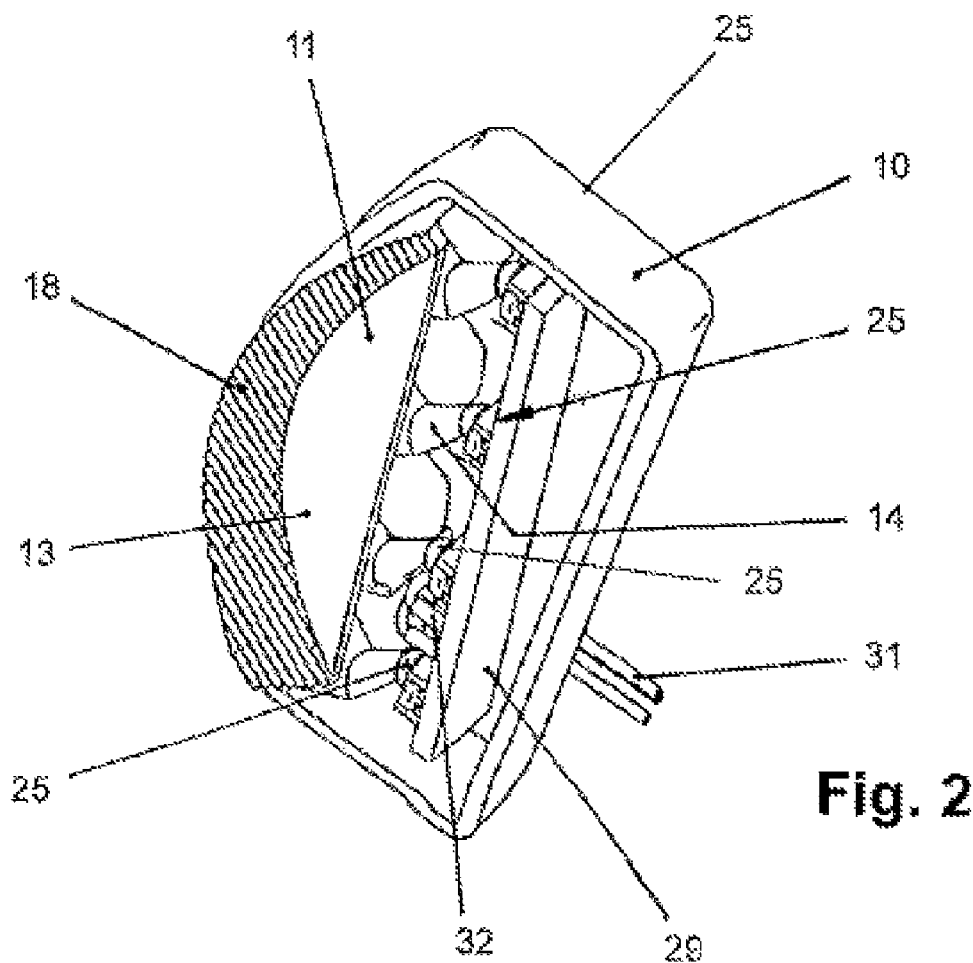
FIG. 2 a perspective view of the display unit according to FIG. 1.
Figure 3:
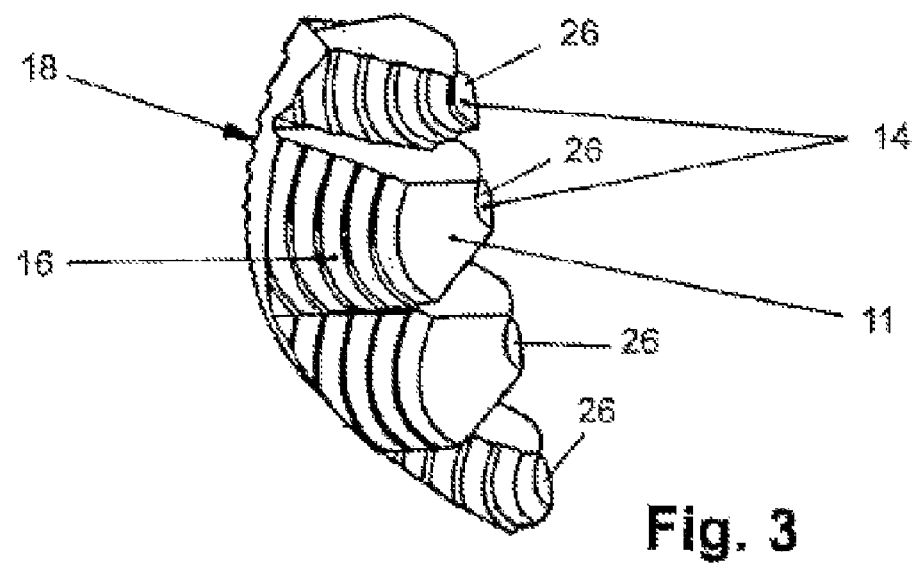
FIG. 3 a light conductor body of the display unit according to FIG. 2 in a perspective illustration.

As it is evident from FIGS. 2 and 3, the light conductor 11 comprises conically tapered coupling optics 14 with a respective face side 26, which is adapted to the shape of the respective illuminant 25. By means of these optics 26, the light beams 12 are conducted almost in parallel to a reflection side 15, which is located opposite to the coupling side. In the embodiment the reflection side is formed of several staged reflection surfaces 16, between which separation surfaces 17 are provided, which are aligned in parallel to the light beams 12, impacting the reflection surfaces 16. The separation surfaces 17 are disposed in the embodiment in parallel to the mirror glass 2 in a sectional view according to FIG. 1. The light beams 12 are deflected towards the mirror glass 2 at the reflection surfaces 16, and impact deflection optics 18, which deflect the light beams 12 at a defined angle, in the embodiment e.g. at an angle of 30°.

The deflection optics 18 are substantially comprised of surfaces 19 disposed transversal to the light beams 12, which are machined into the light conductor 11 at a slant, corresponding to the deflection angle. In this case, separation surfaces 20 are provided between the particular surfaces 19, as described with reference to the reflection surfaces 16. They are also aligned parallel to the light beams 12, which impact the deflection optics 18. The deflection surfaces 19, which are substantially disposed transversal to the light beams 12, are preferably disposed within the projection of the light beams 12, which are deflected by the reflection surfaces 16.

Between the deflection optics 18 of the light conductor 11 and the backside of the mirror glass 2, a filter 21 is provided, which almost completely fills an almost partially reflection free portion 7 of a light emission surface 8 of the mirror glass 2. The filter 21 is provided as a foil and passes impacting light, which is directed from the deflection optics to the foil, only in one emission direction. Light beams 12 pointing away from this direction are not passed by the filter foil 21, and are reflected back into the light conductor 11. The emission direction coincides with the emission angle of the light beams 12. For a simple and fast assembly, the foil 21 can be clamped in a friction locked manner between the deflection optics 18 and the backside of the mirror glass 2. Another way to mount this filter foil 21 is gluing it to the backside of the mirror glass 2.

The light conductor 11 contacts the filter 21. The filter foil 21 corresponds to the surrounding reflecting coating 3 of the mirror glass 2 with respect to color and appearance. Thus, it does not stand out, when the illuminant 25 is not turned on, when the user looks at the mirror glass 2.

For the display 1 provided behind the mirror glass 2, the reflecting coating 3 of the mirror glass 2 and the glue layer 4 in the portion of the provided display are cut out in the embodiment. In this portion, the carrier plate 5 for the display 1 is also cut out behind the mirror glass. The reflecting coating 3 can be at least partially reflection free in a portion of the display 1. In an embodiment, which is not shown, the at least partially reflection free coating 3 is formed by thin stripes, disposed close besides one another. In a non-activated display 1, this portion appears approximately like the reflecting mirror coating 3, while a homogenously illuminated surface is visible, when the display is activated.

FIG. 2 shows the display unit 1 as a completely assembled unit for mounting to the carrier plate 5. Herein, the light conductor 11 and several illuminants 25, which are mounted to the circuit board 29, are preassembled in a housing 10. The mounting of these components can be performed by suitable means like interlocked connections for threaded connections. The illuminants 25 are disposed on the circuit board 29, so that they are disposed exactly in the focal points of the light conductor elements 14, which form the coupling optics. The light emitted by the illuminants 25 into the light conductors 11, is deflected at the reflection surfaces 16 and exits in the portion of the deflection optics 18 from the light conductor 11. On the backside of the housing 10, connection cables 31 for supplying the illuminants 25 with power are run out, which are connected to the circuit board 25 through electrical contacts 32.

The deflection optics 18 illustrated in FIG. 2 in an exemplary manner have sickle shape. According to this sickle shape, the particular light conductor segments 14 are configured for a homogenous illumination of the display surface, and disposed so that an even illumination of the display surface is assured. From FIG. 3, the disposition of the light conductor segments 14 is visible, which are disposed next to one another at a distance from the deflection optics 18. The reflection surfaces 16 of the particular light conductor segments 14 are configured as three-dimensional curved surfaces. Their curvature is greater than the curvature of the sickle shaped display surface of the deflection optics 18. The stronger curvature of the reflection surfaces 16 is required in order to facilitate an even illumination of the display surface and in order to have the display surface appear as a homogenously illuminated surface.

FIG. 4 shows the mirror glass 2 surrounded by the frame 6 of the carrier plate 5 with the sickle shaped display field 8, which is disposed in the outer rim portion of the mirror glass 2 in this embodiment. The light beams 12 exiting from the display field 11 as illustrated in FIG. 1, are directed towards the driver at a defined angle and additionally directed by the filter foil 21, so that a subsequent traffic partner cannot sense the light signals of the display unit 1. Thereby, the subsequent traffic, or lateral traffic partners are not irritated or confused.

FIG. 5 shows another configuration of an optical output of the display unit 1. Certainly, any optical equipment of the deflection surface 19 can be provided on the deflection optics 18. This is advantageous, e.g. when such display units 1 are not only intended as displays for the driver, but shall additionally have e.g. the function of a driving direction indicator. In this case, the display field 8 can be moved up to the rim of the mirror glass 2. This position allows placing a driving direction indicator as it is used in currently typical driving direction indicators. It is furthermore conceivable that a driving direction indicator is combined with a warning display 35 (FIG. 6) for transmitting information to the driver. In this case, part of the display field with the described deflection optics 18 is configured for informing the driver and another component is configured with deflection optics, so that the subsequent traffic is intentionally informed by the emitted light signals. Such embodiments require that several light functions, e.g. light conductor designs, are combined.

Figure 6:
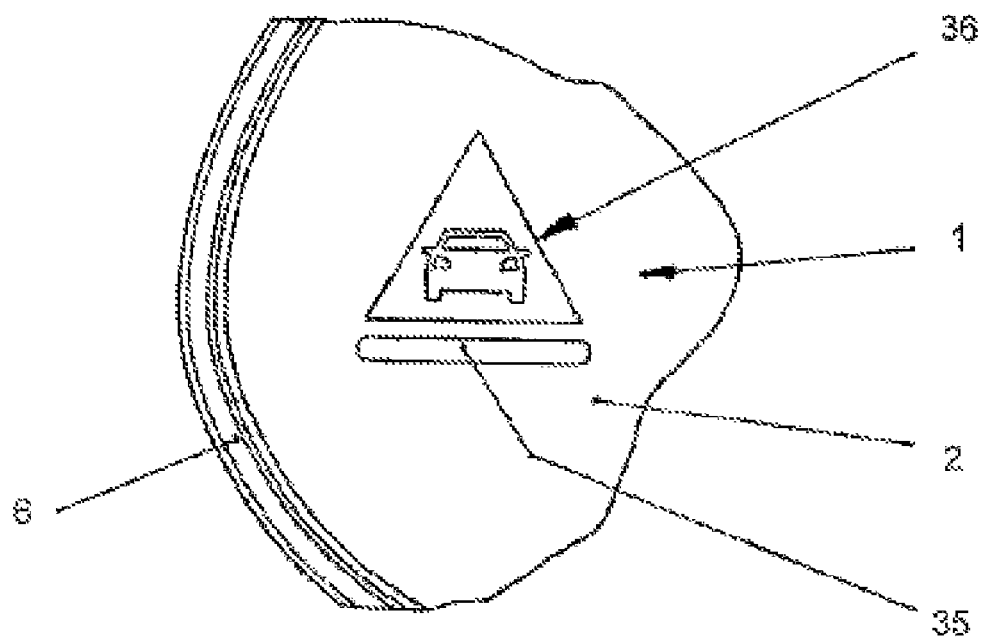
FIG. 6 a component of a rearview mirror according to the invention with a symbolized display.

In the embodiment according to FIG. 6, the rim portion of the mirror glass 2 is illustrated in the form of a symbol 36. It is comprised e.g. of a triangle with a symbolized front image of a vehicle disposed therein. Below the triangle, a bar is provided as an optical warning bar 35. Both display elements, the symbol 36 and the optical warning bar 35, can send light signals to the driver jointly or independently from one another, or in different colors. It is possible e.g. that the symbol 36 signals an approaching vehicle to the driver, while an additional illumination of the optical warning bar 35 indicates a potentially dangerous situation. In this case, passing vehicles can already be in such a position relative to one's own vehicle, so that a lateral movement of one's own vehicle is not possible anymore without risk.

Figure 7:
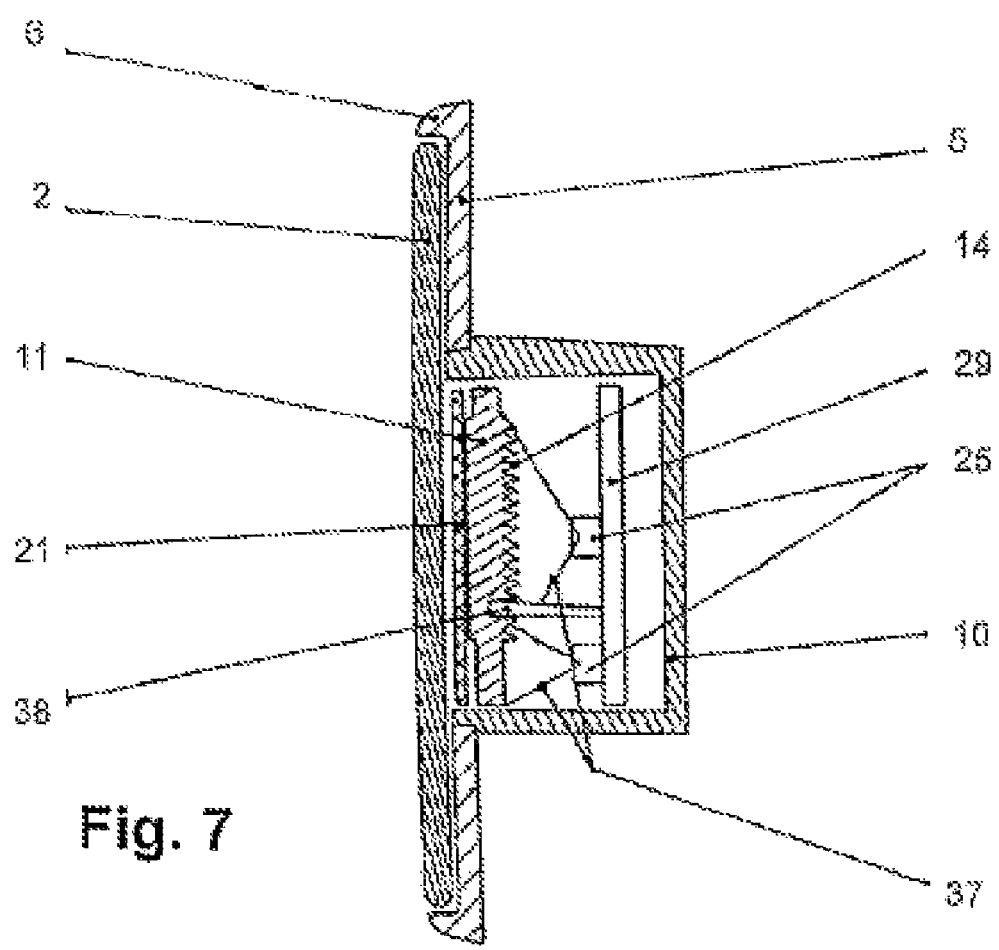
FIG. 7 a sectional view of a multi-component display, which is disposed behind a mirror glass of the rearview mirror.

An exemplary configuration of such a combined display unit 1 is shown in FIG. 7. The display unit 1 is again provided behind mirror glass 2, which is mounted to the carrier plate 5. In a at least partially reflection free portion 7 of the mirror glass 2, the foil is disposed as a filter 21 in the described manner. In contact with the foil 21, the light conductor 11 is disposed, which is divided in this embodiment by a separation wall 38 into two optically independent display portions. In order to generate the symbol 36 and the warning bar 35, respective proper illuminants 25 are provided on a joint circuit board 29. The illuminants 25, preferably LEDs, comprise different light emission angles 37, corresponding to the area to be illuminated. The separation wall 38 prevents an overlap of the light cones, so that no overlap and thus no partial illumination of the symbol 36 and of the optical warning bar 35 occurs by a light source 25 not associated with this function.

An exact positioning of the illuminants 35 relative to the light conductor 11 and of the light conductor in the housing 10 are not important in this context. The beams 12 emitted by the illuminants 25 do not have to be precisely positioned with respect to possible reflection surfaces of the light conductor 11. Thus in this case the light conductor 11 can be configured as a flat component. The filter foil 21 can thus be advantageously applied to a flat side of the light conductor 11. The positioning of the display unit 1 relative to the mirror glass 2 is performed by the reception between the mirror plate 5 and the housing 10. This is advantageous in particular, since thus the entire display unit 1 can be preassembled in the housing 10. A simple and particularly fast assembly of the complete display unit can thus be performed without the risk of errors occurring during the assembly.

In another embodiment, which is not shown, the display unit is not disposed behind the mirror glass and the carrier plate, but it is provided in the portion of the frame 6. It is provided light permeable at one or also at several locations, as this has been described for the mirror glass 2 in the portion 8. In this light permeable portion the frame 6 is provided with the filter 21, by which the light decoupled from the light conductor 11, is directed, so that a subsequent traffic partner cannot sense the light signals of the display unit. The light conductor 11 is provided according to the described embodiments and only configured, so that the light emitted into the light conductor by the illuminant 25 is directed outward by means of the deflection optics 18 in the described manner through this light permeable portion. The effect of the light conductor 11 in this case is identical to the described embodiments. The filter 21 corresponds to the surrounding portion of the frame 6 with respect to color and appearance, so that it does not draw any attention, when the illuminant 25 is not turned on, when the user looks at the frame 6.

Besides the different position of the light permeable portion, the rearview mirror is configured identical as previously described with reference to FIG. 1 through 7.

The mirror glass 2 does not require a proper light permeable portion, when the light permeable portion is provided in the frame 6. It is however certainly also possible that the mirror glass 2 additionally comprises at least one light permeable portion.

What is claimed is:

1. A mirror for a vehicle operated by a driver, comprising:
   a carrier plate;
   a mirror glass having a reflector side including a reflective coating, mounted to said carrier plate; and
   a display unit, disposed behind said mirror glass and said carrier plate, said display unit including at least one illuminant for generating light, and a light conductor disposed adjacent said at least one illuminant to be coupled therewith and receives the light emitted from said at least one illuminant, said light conductor having a reflector side and deflection optics, whereby the light is directed outward through a portion of the mirror glass, which is at least partially reflection free, wherein said reflector side includes at least two reflection surfaces, and said deflection optics including deflection surfaces, which are disposed transversal to the light to direct the light through one of said portion of the mirror glass which is partially reflection free towards the driver.

2. A mirror according to claim 1, wherein the light conductor includes coupling optics configured so that the light in the light conductor is conducted in parallel with each other.

3. A mirror according to claim 1, wherein the light in the light conductor extend approximately in parallel to the mirror glass after entering into the coupling optics.

4. A mirror according to claim 1, wherein between the particular reflection surfaces, separation surfaces are provided, which are substantially disposed in parallel to the light.

5. A mirror according to claim 1 including separation surfaces are disposed between the deflection surfaces, which extend substantially in parallel to the light.

6. A mirror according to claim 1, wherein the deflection optics are provided at an outside surface of the light conductor.

7. A mirror according to claim 1, wherein the light conductor and the illuminant are disposed in said display unit mounted to the carrier plate in a sealing manner.

8. A mirror according to claim 1, wherein the deflection optics and the portion of the mirror glass which is at least partially reflection free are configured at least in the form of one symbol.

9. A mirror according to claim 1 including at least one filter disposed between the light conductor and the backside of the mirror glass, which passes the light exiting from the light conductor only in emission direction.

10. A mirror according to claim 9, wherein the filter corresponds to the reflecting coating of the mirror glass with respect to color and appearance, when viewed from the outside of the mirror glass.

11. A mirror according to claim 9, wherein the filter includes light permeable portions in the form of at least one symbol.

* * * * *